United States Patent [19]

Piggott

[11] 3,991,003

[45] Nov. 9, 1976

[54] COATING COMPOSITIONS

[75] Inventor: Kenneth Elliot Piggott, Durban, South Africa

[73] Assignee: Prolux Paint Manufacturers Limited (PTY), Transvaal, South Africa

[22] Filed: June 24, 1975

[21] Appl. No.: 590,014

[30] Foreign Application Priority Data

June 25, 1974 South Africa........................ 74/4070

[52] U.S. Cl. .................... 260/33.6 UB; 260/75 NP; 260/77.5 AM; 260/77.5 AN; 260/78.3 UA; 260/859 R
[51] Int. Cl.² ........................................... C08K 5/01
[58] Field of Search ... 260/859 R, 75 NP, 77.5 AM, 260/77.5 AN, 33.6 UB, 78.3 UA

[56] References Cited

UNITED STATES PATENTS

| | | | |
|---|---|---|---|
| 3,330,814 | 7/1967 | Vasta | 260/78.3 UA |
| 3,352,830 | 11/1967 | Schmitt et al. | 260/77.5 AT |
| 3,549,569 | 12/1970 | Farah | 260/18 TN |
| 3,699,061 | 10/1972 | Cunningham | 260/77.5 AN |
| 3,749,687 | 7/1973 | Aronberg et al. | 260/33.6 UB |
| 3,836,492 | 9/1974 | Watanabe et al. | 260/859 R |

OTHER PUBLICATIONS

Saunders et al. — Polyurethanes, II Technology (Interscience) (N.Y.) (1964), pp. 533–534.

*Primary Examiner*—Donald E. Czaja
*Assistant Examiner*—H. H. Fletcher
*Attorney, Agent, or Firm*—Cushman, Darby & Cushman

[57] ABSTRACT

Two-component air-drying varnishes and pigmented enamels comprise the following, dissolved in an essentially aliphatic liquid medium: (i) a film-forming adduct of isophorone diisocyanate and the condensation product of a polybasic acid with an epoxy compound, and (ii) a film-forming polyhydroxy compound, the components (i) and (ii) being mutually compatible.

11 Claims, No Drawings

COATING COMPOSITIONS

This invention relates to new, two-component air drying clear varnishes and pigmented enamels.

Two-component polyurethane enamels are well known to the art and comprise alkyd, acrylic or polyester resins or polyols cross-linked by polyfunctional isocyanates or isocyanate adducts. Unfortunately these products have to be dissolved in strong solvents, such as ketones and acetates, and problems then occur with lifting or wrinkling of standard alkyd based coatings when the polyurethane system is applied over them. Also, these solvents have a strong odour which causes discomfort to the applicator when the coatings are applied in an enclosed area.

It is an object of the present invention to provide two-component polyurethane systems which can be dissolved in the aliphatic solvents of Kauri-Butanol number less than 40 commonly used in standard air drying alkyd based finishes, which can be easily applied by brush or roller over conventional type paint films without fear of lifting or wrinkling the previous coating and which dry to give glossy, hard and durable films.

It is a further object of the invention to provide a white enamel formulated on the two-component polyurethane system which exhibits a reduced tendency to yellow or discolour on exposure (a typical failure of existing coatings which are soluble in solvents of low Kauri-Butanol number).

According to the invention there is provided a compatible mixture, suitable for use as a coating composition, of two components dissolved in a liquid medium comprising a solvent of Kauri-Butanol number less than 40, the said components being (i) a film-forming material which is the adduct of isophorone diisocyanate and the condensation product of a polybasic acid with an epoxy compound, and (ii) a film-forming polyhydroxy compound.

The compound referred to herein as isophorone diisocyanate is 3- isocyanatomethyl-3,5,5-trimethylcyclohexyl isocyanate.

The polybasic acid which is reacted with an epoxy compound in order to form the condensation product, the isophorone diisocyanate adduct of which is the component (i), may be any aliphatic or aromatic polybasic acid such as adipic aid, sebacic acid or isophthalic acid; it may be a polybasic acid containing hydroxyl groups, such as citric acid.

A particularly suitable class of epoxy compounds with which the polybasic acids may be reacted are glycidesters having the general formula:

$$CH_2 - CH - CH_2 - O - \underset{\underset{O}{\|}}{C} - R$$
$$\diagdown O \diagup$$

where R is the residue of an organic acid.

These compounds react with the epoxide ring, with the simultaneous production of a glycerol-derived residue.

An especially suitable glycidester is that having the above formula wherein R is branched chain of the formula:

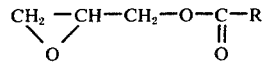

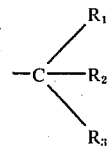

Particularly suitable compounds of this type are mixtures of glycidesters wherein $R_1$ and $R_3$ are hydrogen atoms or methyl groups and wherein $R_2$ is a hydrocarbon residue with a straight aliphatic chain, containing between 1 and 11 carbon atoms. The epoxide equivalent weight of said mixtures is about 245. Such compounds are sold by the Shell Chemical Corporation under the trade marks "Cardura E" and "Cardura E10".

It is also possible to use synthetically produced polybasic acids obtained by the reaction of a polyol with an aliphatic or aromatic acid anhydride in the ratio of one mole of polyol to two moles of anhydride. For instance a polybasic acid suitable for reaction with the glycidester may be formed from one mole of glycerol and two moles of phthalic anhydride, the anhydride ring being opened at a temperature between 80°–100° C. Once the anhydride ring is opened the polybasic acid so formed can then be reacted with the glycidester. It is more convenient in practice to charge the polyol, anhydride and the glycidester together to the reaction vessel and raise the temperature to 85°–95° until the anhydride ring is opened and then raise the product temperature to effect the reaction of the remaining carboxylic groups with the glycidester.

The selection of isophorone diisocyanate to be used in forming component (i) of the mixtures of the invention is based on two features. Firstly, it has been found that the adducts formed using this diisocyanate have a wide tolerance to aliphatic solvents of Kauri-Butanol number less than 40. Secondly, the two isocyanate groups present have quite different reactivities, that attached to the cyclohexane ring through the methylene groups reacting with a hydroxyl group approximately eight times faster than the isocyanate group which is attached directly to the cycloaliphatic ring. Consequently, the isocyanate adduct formed is low in monomeric diisocyanate content. It is also an advantage that, because the isocyanate group remaining unreacted in the adduct is very slow reacting, the pot-life or stability of the systems of the invention (subsequent to mixing of the two components) is enhanced.

The amounts taken of the two reactants from which the component (i) is formed, namely the isophorone diisocyanate and the polybasic acid/epoxy compound condensation product, are such that, by virtue of the above-mentioned differences in reactivity of the two isocyanate groups, one of those groups reacts with the hydroxyl groups in the condensation product whilst the other isocyanate group remains substantially unreacted. This means in practice that substantially one mole of the diisocyanate is used for each hydroxyl group present. The reaction of the condensation product with the diisocyanate is carried out in a solvent or a mixture of solvents at a temperature of between 20° and 160° C, preferably 75° and 100° C. It is preferred that a substantial amount of an aliphatic solvent of Kauri-Butanol number less than 40 is present so that the final products do not give rise to recoating problems when used to overcoat established alkyd based coatings.

A catalyst is added to promote the reaction of the iso-cyanate group with the hydroxyl group of the co-polymer condensate. The catalyst may be a metal complex such as di-butyl tin di-laurate or zinc salts such as zinc octoate or tertiary amines or combinations of these. Generally the level of catalyst used is between 0.05–2.00 per cent on the total solid reactants.

The film-forming polyhydroxy component (ii) of the mixture of the invention may be any of the many suitable compounds of that class which are well known to those skilled in the coatings art. Thus for example, there may be used alkyd resins, optionally vinylated, hydroxyl group-containing polyesters and hydroxylated acrylic or vinyl polymers. It is, however, advantageous if the component (ii) is of itself capable of forming a film by a "lacquer" type drying process, i.e. drying without the occurrence of any chemical change. For this reason a preferred class of polyhydroxy compound is a copolymer of (a) an $\alpha,\beta$-ethylenically unsaturated mono- or di-basic carboxylic acid or anhydride, and/or an (oxy)alkyl hemiester of such an acid, reacted with an epoxy compound and (b) one or more other ethylenically unsaturated monomers. Suitable unsaturated carboxylic acids from which this preferred class of polyhydroxy compounds may be derived include maleic acid, fumaric acid and itaconic acid.

Preferred epoxy compounds are the glycidesters previously described, especially those in which the group R is a branched chain aliphatic group, for example the compounds sold under the trade mark Cardura E and Cardura E10 which have already been referred to. Such epoxides and unsaturated carboxylic acids may be reacted together at a temperature of between 80° and 200° C until an acid value of below 10 mgms KOH per gm is obtained, indicating that most of the epoxide rings have been opened by the carboxylic acid groups to introduce a hydroxyl group or, in the case of the glycidesters, a glycerol-derived residue. A solvent may be present if desired.

The copolymer constituting the preferred component (ii) is then formed by reacting the $\alpha,\beta$-ethylenically unsaturated ester containing the residual glycerol residue or hydroxyl group with one or more other ethylenically unsaturated monomers.

Some ethylenically unsaturated monomers which are suitable to form the copolymer are (alkyl) vinyl benzenes, such as vinyl toluene or methyl styrene, and the esters of methacrylic or acrylic acid with up to twelve carbon atoms in the alkyl group, for example 2-ethylhexylacrylate; other ethylenically unsaturated monomers such as styrene, acrylamide, methacrylamide and hydroxyl-containing vinyl monomers may be included to form the copolymers.

The copolymers are formed by polymerising the ethylenically unsaturated monomers with the $\alpha,\beta$-ethylenically unsaturated ester containing the residual glycerol residue in the presence of a peroxide catalyst or azo compounds. The process may be carried out in the presence of an aliphatic solvent with a Kauri-Butanol number of below 40 or alternatively in a mixture of an aliphatic and aromatic solvent, or if so desired completely in an aromatic solvent.

The process of polymerisation in some cases may also be carried out in the absence of a solvent, the product being dissolved in a solvent when the polymerisation has been completed.

If so desired, other polyols, such as Castor Oil may be blended with the co-polymer component (ii) as described above to give desirable properties such as improved flexibility. Alternatively the Castor Oil or polyol may be blended with the condensation products obtained from the polybasic acids as described earlier and then together converted into the iso-cyanate adduct component (i).

The products of the present invention can be used as a two-component clear varnish with or without additives such as ultra violet stabilizers.

Alternatively the polyhydroxy component (ii) may be pigmented by the addition of coloured pigments and the isocyanate adduct component (i) then added to give coloured enamels which dry to very hard, glossy films with good durability.

Where the component (ii) is, as mentioned above, in itself capable of forming a film by a lacquer-type drying process, the varnishes and enamels of the invention undergo a relatively rapid initial dry by virtue of that process, and then become fully cross-linked by means of the subsequent chemical reaction between the polyhydroxy component and the isocyanate adduct component (i).

The invention is illustrated by the following Examples, in which parts and percentages are by weight.

EXAMPLE 1

Component (i)

a.

210 Parts by weight of citric acid monohydrate
750 Parts by weight of Cardura E

The ingredients are charged to a reaction vessel and heated under an inert atmosphere at 90° C. The heat source is removed and the exotherm causes the temperature to rise to 180°–5° C. The temperature is held until the acid value of the product is 6,4 mgms KOH per gm. The product is cooled to 60° C.

b.

1200 Parts by weight of white spirit
880 Parts by weight of isophorone di-isocyanate
  (3-isocyanate methyl 3, 5, 5 - trimethylcyclohexyl isocyanate)

The two ingredients are added to the product from (a) in the reaction vessel and the temperature brought to 60° C. Twenty parts by weight of a ten per cent solution in xylene of di-butyl tin di-laurate are added and a slight exotherm occurs which raises the temperature to 74° C. The temperature is held at 70°–5° C for four hours, when the product has a non-volatile content of 59.4 per cent, an acid value of 1.2 mgms KOH per gm and a viscosity of L - M (G.H.) at 25° C.

Component (ii)

Stage 1

540 Parts by weight of Fumaric acid
2460 Parts by weight of Cardura E

The ingredients are charged to a reaction vessel and heated with agitation to 110° C. The heating source is removed and the exotherm caused by the splitting of the epoxide ring causes the temperature to rise to 186°–190° C. After 30 minutes the temperature has dropped back to 170°–175° C and this temperature is maintained until a viscosity of $Z_4 - Z_5$ (Gardner-Holt bubble tube) at 25° C and an acid value of 1.8 mgms KOH per gm is obtained. The product is diluted to 80 per cent solid content with white spirit to give a viscosity of L - M (G.H.) at 25° C and a specific gravity of 0.995 at 25° C.

Stage 2 a.
- 750 Parts by weight of white spirit
- 132 Parts by weight of the product from Stage 1 at 80 per cent solids
- 36 Parts by weight of vinyl toluene
- 4 Parts by weight of Di-tertiary butyl peroxide The ingredients are charged to a reaction vessel and heated to a temperature of 160°–5° C under reflux conditions.

b.
- 1182 Parts by weight of the product from Stage 1 at 80 per cent solids
- 324 Parts by weight of vinyl toluene
- 90 Parts by weight of styrene
- 18 Parts by weight of di-tertiary butyl peroxide.

The above ingredients are mixed and added slowly to the product from (a) in the reaction vessel over a period of 2½–3 hours, keeping the temperature at 160°14 165° C. The temperature is held for a further 4 hours, and the product then has a non-volatile content (determined on 2 – 3 gms of sample held for 3 hours at 108° C) of 60,4 per cent, with a viscosity of T - U(G.H.) at 25° C.

Stage 3 a.
- 535 Parts by weight of white spirits
- 132 Parts by weight of the product from Stage 1 at 80 per cent solid content
- 36 Parts by weight of vinyl toluene
- 4 Parts by weight of di-tertiary butyl peroxide The ingredients are heated to 160°–165° C in a reaction vessel fitted with a reflux condenser.

b.
- 748 Parts by weight of the product from Stage 1 at 80 per cent solid content
- 161 Parts by weight of vinyl toluene
- 180 Parts by weight of 2-ethyl hexyl acrylate
- 20 Parts by weight of di-tertiary butyl peroxide The above ingredients are mixed and added slowly to the product from (a) in the reaction vessel over a period of 3 hours keeping the temperature at 160°–5° C. The temperature is held for a further 4 hours, when the solid content is found to be 60.9 per cent and the viscosity (G.H.) is I at 25° C.

A. A white enamel is prepared from the product of Stage 3, component (ii), pigmented with titanium dioxide at a pigment to binder solids ratio of two parts of pigment to one part of binder solids by weight. The enamel is diluted to 110 seconds on a Ford Number 4 Cup at 25° C with white spirits.

B. Component (i) is also diluted with white spirits to a viscosity of 110 seconds on a Ford Number 4 Cup at 25° C.

The products from (A) and (B) above are mixed at a ratio of one to one by volume and the resultant white enamel brushed on to a metal panel. After 4 hours the enamel has reached the dust free dry stage, and after sixteen hours has a hardness measured by Sward Pendulum Hardness Tester (glass=100) of 16. The pot-life, or time after which the white enamel can no longer be brushed easily, is 6 hours after mixing the two components.

EXAMPLE 2

70 Parts of a 60% dehydrated castor oil/soya bean oil 1:2 wt/wt alkyd are reacted with 30 parts of vinyl toluene by drip feeding the vinyl toluene, containing 0.6 g of di-tertiary-butyl peroxide as catalyst, into a solution of the alkyd in 67 g of aliphatic hydrocarbon (boiling range 140°–200° C and containing 18–20% aromatics). The polymerisation reaction is carried out at 140° C for 6 hours.

The acid value of the resulting 60% solution of vinyl toluenated alkyd is 5 mg KOH/g and it has a hydroxyl value of 35 mg KOH/g. 2 parts of this vinylated alkyd solution are blended with 1 part of the isocyanate adduct described as component (1) of Example 1 and diluted with 1 part of white spirit. 0.05% of dibutyltin dilaurate, based on the total weight of the blend, is used as catalyst. Films of 0.004 inch wet thickness are spread on glass of the vinylated alkydisocyanate adduct blend, and of the vinylated alkyd alone. A clear, tough film is obtained on overnight drying from the vinylated alkyd/isocyanate adduct, whereas the film from the vinylated alkyd alone, although surface dry, is very soft and cheesy.

EXAMPLE 3

Component (i)

Stage 1
- 196 Parts by weight of maleic anhydride
- 148 Parts by weight of butyl alcohol
- 500 Parts by weight of Cardura E10

The ingredients are charged to a reaction vessel and heated to 90°–95° C. The heat source is removed and the exotherm carries the temperature to 175° C. The charge is held at this temperature until the product has an acid value of 3.5 mgms KOH/gm; it is then cooled.

Stage 2

The product from Stage 1 is mixed with:
- 186 Parts by weight of vinyl toluene
- 80 Parts of 2-ethylhexyl acrylate
- 12 Parts of di-tert-butyl peroxide The mixture is fed into a reactor containing 800 parts by weight of white spirit at 160°–165° C, the addition being made over 90 minutes so as to maintain the temperature at 160°–165° C. The temperature is held at this value for a further 4 hours.

Stage 3

The product from Stage 2, cooled to 80° C, is mixed with 440 parts by weight of isophorone diisocyanate and 12 parts by weight of a 10% solution in xylol of dibutyltin dilaurate. The reaction temperature is increased to 90° C and held there for 4 hours. The product has a final non-volatile content of 65.4% and a viscosity of W(G.H.) at 25° C.

Component (ii)

This component is an oil-modified alkyd resin containing 36% of phthalic anhydride, formulated as a 50% non-volatile content solution in white spirits.

60 Parts of the adduct component (i) described above are mixed with 100 parts of the alkyd component (ii), together with 1 part of dibutyltin dilaurate. The blend is brushed on to a metal panel. After 4 hours the resulting clear film is dry, and after curing overnight it is of good hardness. The film can alternatively be heat cured at 60° C for 60 minutes.

What I claim is:

1. A mixture, suitable for use as a coating composition, of two components dissolved in a liquid medium comprising a solvent of Kauri-Butanol number less than 40, the said components being (i) a film-forming material which is the adduct of isophorone diisocyanate and the condensation product of a polybasic acid with an epoxy compound, substantially one mole of said diisocyanate being used for each hydroxy group present in said condensation product, and (ii) a film-forming polyhydroxy compound, the said components (i) and (ii) being mutually compatible.

2. A mixture as claimed in claim 1, wherein the epoxy compound which is condensed with the polybasic acid is a glycidester having the general formula:

$$CH_2 \underset{O}{\overset{}{\diagdown\!\!\!\diagup}} CH-CH_2-O-\underset{O}{\overset{\|}{C}}-R$$

where R is the residue of an organic acid.

3. A mixture as claimed in claim 2, wherein the group R in the glycidester is a branched chain of the formula:

$$-C \begin{matrix} \diagup R_1 \\ -R_2 \\ \diagdown R_3 \end{matrix}$$

wherein $R_1$ and $R_3$ are hydrogen atoms or methyl groups and wherein $R_2$ is a straight-chain aliphatic hydrocarbon residue containing between 1 and 11 carbon atoms.

4. A mixture as claimed in claim 1, wherein the polybasic acid is synthetically produced by the reaction of one mole of a polyol with two moles of an aliphatic or aromatic acid anhydride.

5. A mixture as claimed in claim 1, wherein the isophorone diisocyanate and the condensation product of the polybasic acid and the epoxy compound are reacted together in the proportions of substantially one mole of the diisocyanate to each hydroxyl group present.

6. A mixture as claimed in claim 5, wherein the isophorone diisocyanate and the condensation product are reacted together at a temperature between 75° and 100° C in the presence of a catalyst.

7. A mixture as claimed in claim 1, wherein the component (ii) is a copolymer of (a) an $\alpha,\beta$-ethylenically unsaturated mono- or di-basic carboxylic acid or anhydride, and/or an (oxy)alkyl hemiester of such an acid, reacted with an epoxy compound and (b) one or more other ethylenically unsaturated monomers.

8. A mixture as claimed in claim 7, wherein the epoxy compound involved in the formation of the component (ii) is a glycidester having the general formula:

$$CH_2 \underset{O}{\overset{}{\diagdown\!\!\!\diagup}} CH-CH_2-O-\underset{O}{\overset{\|}{C}}-R$$

where R is the residue of an organic acid.

9. A mixture as claimed in claim 8, wherein the group R in the glycidester is a branched chain grouping of the formula $$-C \begin{matrix} \diagup R_1 \\ -R_2 \\ \diagdown R_3 \end{matrix}$$

where $R_1$ and $R_3$ are hydrogen atoms or methyl groups and where $R_2$ is a straight-chain aliphatic hydrocarbon residue containing between 1 and 11 carbon atoms.

10. A mixture as claimed in claim 7, wherein the other ethylenically unsaturated monomer is vinyl toluene or 2-ethylhexyl acrylate.

11. An air-drying white enamel comprising a compatible mixture as claimed in claim 1, a white pigment being present in the component (ii).

* * * * *